United States Patent Office 2,839,480
Patented June 17, 1958

2,839,480

COMPOSITIONS OF MATTER COMPRISING AN ETHOXYLINE RESIN AND AN ALKYLENE POLYAMINE CONTAINING AT LEAST TWO TERTIARY AMINO GROUPS

Gustav Heinrich Ott, Arlesheim, Adrian Marxer and Heinz Zumstein, Basel, and Kurt Brugger, Binningen, Switzerland, assignors to Ciba Limited, Basel, Switzerland, a Swiss firm No Drawing. Application August 1, 1955
Serial No. 525,815

Claims priority, application Switzerland August 10, 1954

17 Claims. (Cl. 260—18)

Polyglycidyl ethers of polyhydroxy compounds are known under the names "ethoxyline resins" and "epoxide resins." They can be obtained in known manner by reacting an epoxide compound, especially epichlorhydrin, with polyhydroxy compounds, preferably with a polyhydric phenol, such as resorcinol or hydroquinone. Especially useful are the products obtainable by reacting epichlorhydrin with 4:4'-dihydroxy-diphenyl-dimethylmethane in an alkaline medium.

Numerous compounds have been suggested as hardening agents for ethoxyline resins, for example, inorganic salts or acids, Friedel-Crafts catalysts, organic acid anhydrides, aliphatic and aromatic amines or salts thereof, etc. Especially important are aliphatic polyamines, because they bring about the hardening at room temperature to yield hardened products which are distinguished by their adhesive power, hardness and resistance towards chemicals. Accordingly, the use of aliphatic polyamines is especially advantageous in the manufacture of coatings, lacquers or lacquer films on supports of all kinds, and also for producing excellent adhesive bonds for uniting together materials of the same or different kinds, and especially for adhesively uniting metals. As hardening agents for ethoxyline resins there have been used with advantage such aliphatic polyamines as diethylene triamine, triethylene tetramine, tetraethylene pentamine, 1:2-diamino-methyl-propane, 2:4-diamino-2-methyl-pentane, N:N'-diethyl-1:2-ethylene diamine, N:N-dimethyl-1:2-ethylene diamine and N:N-dimethyl-1:3-propylene diamine, that is to say aliphatic polyamines which either contain only primary or secondary amino groups or contain one tertiary amino group in addition to a primary amino group.

The present invention provides a method of hardening ethoxyline resins, particularly those derived from polyhydric phenols, with the aid of aliphatic polyamines wherein there is used as hardening agent an alkylene polyamine which contains at least two tertiary amino groups and is free from other substituents capable of reacting with epoxide groups. The alkyl groups present in the tertiary amino groups are those containing 1-4 carbon atoms, advantageously 1-2 carbon atoms, and are more especially methyl groups.

As alkylene polyamines there are to be understood, as is known to those skilled in the art, in this description and in the claims polyamines of which all the amino groups are bound to alkylene groups which are themselves connected together directly or through —NH—

—O— or —S— linkages.

As examples of alkylene polyamines for use in the present invention there may be mentioned: Tetramethyl-ethylene diamine, tetramethyl-diethylene triamine, penta-methyl-diethylene triamine, hexamethyl-triethylene tetramine, heptamethyl-tetraethylene pentamine, bis-(N:N-diethylaminoethylaminoethyl)-amine, bis-(N:N - dimethyl-aminoethyl)-ether, bis-(N:N-diethyl-aminoethyl)-sulfide, tri-(N:N-diethylaminoethyl) - amine, N:N:N':N' - tetramethyl-1:2-diaminopropane and N:N:N':N'-tetramethyl-2:4-diamino-2-methylpentane.

Especially suitable are polyalkylene polyamines which contain 3–5 nitrogen atoms and of which nitrogen atoms at least the two end nitrogen atoms are those of tertiary amino groups.

The amines customarily used hitherto as hardening agents lead to unsatisfactory results in many cases. A disadvantage of these amines is, for example, that when the ethoxyline resins are hardened in an atmosphere of which the relative humidity is 90–100 percent, products are obtained which are not hardened or are unsatisfactorily hardened and have a cloudy appearance. If it is attempted under these atmospheric conditions to harden, for example, lacquer films such as coatings of boilers, exterior paints, coatings on ships or on wood, etc., the films so produced with the aid of the customary amines exhibit places having a whitish appearance which render the film cloudy. This disadvantage is especially marked in regions where the relative humidity frequently reaches 90–100 percent as, for example, in coastal regions, tropical countries or highly industrialized areas. When the hitherto usual amines are employed as hardening agents for ethoxyline resins used for the so-called cold-bonding of metals, that is to say, at temperatures of about 10–50° C., there are obtained shear strengths inferior to those obtained in the so-called hot-bonding, for example, at temperatures of about 70–120° C.

It has been found that the amines used in the present invention lead to unexpectedly better results than those obtained when the usual amines are used. Thus, with the alkylene polyamines used in this invention coatings can be hardened at a relative humidity of 90–100 percent and at temperatures of 10–50° C. to yield hard and resistant films of extraordinarily good adhesion, which possess a good, non-cloudy appearance. By using these alkylene polyamines in cold-bonding, shear strengths can be attained which are comparable with or in many cases exceed those attained in hot-bonding with the usual amines.

The alkylene polyamines are advantageously used in the method of this invention in a proportion within the range of 1–20 percent on the weight of the ethoxyline resin used. In making adhesive compositions there is advantageously used a proportion of the alkylene polyamine such as to provide about one amino group for every 3–4 epoxide groups in the ethoxyline resin. A single alkylene polyamine or a mixture of such amines may be used, or a mixture of such an alkylene polyamine with an amine known as a hardening agent. Thus, the alkylene polyamines used in this invention can be used with advantage in addition to the known condensation products containing amino groups in end positions and obtained from aliphatic polyamines and dimerized unsaturated fatty acids for hardening ethoxyline resins.

The alkylene polyamines can also be used as hardening agents in the production of casting resins from ethoxyline resins. By hardening in the cold there are obtained hard products, and by hardening with the aid of heat there are obtained mainly elastic products.

The following examples illustrate the invention, the parts and percentages being by weight:

*Example 1*

250 parts of an ethoxyline resin, which has been obtained in known manner from epichlorhydrin and 4:4'-dihydroxy-diphenyl-dimethylmethane, and which contains about one epoxy-equivalent per kilogram, are dissolved in a mixture of 300 parts of butyl acetate, 300 parts of toluene and 150 parts of ethylene-glycol monomethyl-ether. 100 parts of the solution, which has a resin content of 25 percent, are mixed with 1.75 parts of pentamethyl-diethylene triamine. The lacquer solution so obtained is applied to glass plates and hardened at room temperature and at a relative humidity of 95-100 percent. There are obtained hard lacquer films of good adhesion having a clear non-cloudy appearance.

By using instead of 1.75 parts of pentamethylene-diethylene triamine, 1.8 parts of tetramethyl-diethylene triamine, 2.2 parts of N:N:N':N'-tetramethyl-1:2-diaminopropane or 1.2 parts of tri-(N:N-diethylaminoethyl)-amine, the same good result is obtained.

Example 2

250 parts of an ethoxyline resin, which has been obtained in known manner from epichlorhydrin and 4:4'-dihyroxy-diphenyldimethylmethane, and which contains about 2-3 epoxy-equivalents per kilogram, are dissolved in a mixture of 300 parts of butyl acetate, 300 parts of toluene and 150 parts of ethylene-glycol monomethylether. 100 parts of the resulting solution, which has a resin content of 25 percent, are mixed with 2 parts of bis-(N:N-diethylaminoethyl-aminoethyl)-amine. The solution so obtained is applied to glass plates and hardened at room temperature and at a relative humidity of 95-100 percent. There are obtained hard lacquer films of good adhesion having a clear non-cloudy appearance.

By using, instead of 2 parts of bis-(N:N-diethylaminoethyl-aminoethyl)-amine, 1.2 parts of bis-(N:N-dimethyl-aminoethyl) ether or 1.8 parts of heptamethyl-tetraethylene pentamine, the same good result is obtained.

Example 3

71.4 parts of the ethoxyline resin described in Example 2 are dissolved in 14.3 parts of dibutyl phthalate and 14.3 parts of cyclohexanol, and the solution is mixed with 4.4 parts of hexamethyl-triethylene tetramine. The ethoxyline resin-amine mixture is interposed between two plates of a light metal (known in commerce as "Avional M") 170 mm. long, 25 mm. wide and 1.5 mm. thick, the opposing surfaces of the plates overlapping each other to the extent of 1 centimetre. The metal plates are held together with a clamp, and left for 20 hours at 40° C. in order to harden the resin mixture. In this manner an average shear strength of 2.3 kg. per square mm. can be obtained.

By using, instead of 4.4 parts of hexamethyl-triethylene tetramine, 5 parts of tetraethylethylene diamine there can be obtained an average shear strength of 2 kilograms per square millimetre, and by using 7 parts of bis-(N:N-diethylaminoethyl) ether an average shear strength of 2-3 kilograms per square millimetre is obtained. Similar results are obtained by using N:N:N':N'-2:4-diamino-2-methylpentane.

Example 4

100 parts of an ethoxyline resin, which has been prepared in known manner from epichlorhydrin and 4:4'-dihydroxydiphenyl-dimethyl-methane, and which contains about 5.0 epoxy-equivalents per kilogram, are mixed with 25 parts of dibutyl phthalate, and then 10 parts of hexamethyltriethylene tetramine are added. The ethoxyline resin-amine mixture is interposed between metal plates as described in Example 3 and hardened. An average shear strength of 1.9 kilograms per square millimetre can be obtained.

Example 5

100 parts of an ethoxyline resin, which has been prepared in known manner from epichlorhydrin and resorcin, and which contains about 7.9 epoxy-equivalents per kilogram, are dissolved in 25 parts of dibutyl phthalate at about 40° C., and then 15.5 parts of hexamethyl-triethylene tetramine are added at room temperature. The resin-hardener mixture is interposed between metal plates as described in Example 3 and hardened. An average shear strength of 2.0 kilograms per square millimetre can be obtained.

Example 6

148 parts of a viscous polyamide resin containing terminal amino groups, made by condensation of an aliphatic polyamine with an unsaturated dimerized fatty acid, known in commerce under the designation "Polyamide Resin 115," and 12 parts of pentamethyl-diethylenetriamine are dissolved in a mixture of 32 parts of xylene and 8 parts of ethyleneglycol-monoethylether.

100 parts of this solution are mixed with 150 parts of a solution consisting of 120 parts of the ethoxyline resin according to Example 2, 10 parts of xylene and 20 parts of ethyleneglycol-monoethylether. This mixture is thinned with 100 parts of ethyleneglycol-monoethylether, 50 parts of xylene and 50 parts of n-butanol. Glass panels are coated with the resulting lacquer and exposed to a relative humidity of 95-100 percent while curing at room temperature. The cured coatings are hard, clear and show good adhesion.

Example 7

A solvent free, cold curing paste filler can be made by mixing in a pug mill 185 parts of a liquid ethoxyline resin, prepared in known manner from epichlorhydrin and 4:4'-dihydroxydiphenyl-dimethyl-methane, containing approximating 5 epoxy groups per 1000 grams of resin, 45 parts of dioctyl phthalate, 20 parts of benzyl alcohol, 280 parts of heavy spar, 185 parts of a current type lithopone, 145 parts of French chalk and 140 parts of iron oxide red. The resulting pulp is mixed with 90 parts of the polyamide resin described in Example 6 and 10 parts of hexamethyl-triethylenetetramine. Coatings based on this paste filler will cure at room temperature within a short period. They exhibit high chemical, oil and solvent resistance as well as good adhesion to metal surfaces and can easily be sanded after a lapse of 24 to 48 hours.

What we claim is:

1. A composition of matter comprising a resinous polyglycidyl ether of a polyhydric phenol and, as hardening agent, a polyalkylene polyamine in which at least the two end nitrogen atoms are those of alkyl tertiary amino groups and which is free from other substituents capable of reacting with epoxide groups, the alkyl groups of the tertiary amino groups containing 1-2 carbon atoms.

2. A composition of matter comprising a resinous polyglycidyl ether of a polyhydric phenol and, as hardening agent, a 3-5 nitrogen atoms containing polyalkylene polyamine in which at least the two end nitrogen atoms are those of alkyl tertiary amino groups and which is free from other substituents capable of reacting with epoxide groups, the alkyl groups of the tertiary amino groups containing 1-2 carbon atoms.

3. A composition of matter comprising a resinous polyglycidyl ether of a polyhydric phenol and, as hardening agent, a polyalkylene polyamine in which at least the two end nitrogen atoms are those of alkyl tertiary amino groups and which is free from other substituents capable of reacting with epoxide groups, the alkyl groups of the tertiary amino groups containing 1-2 carbon atoms and the hardening agent being present in an amount of 1-20 percent on the weight of the resin.

4. A composition of matter comprising a resinous polyglycidyl ether of a polyhydric phenol and, as hardening agent, a 3-5 nitrogen atoms containing polyalkylene polyamine in which at least the two end nitrogen atoms are those of alkyl tertiary amino groups and which is free from other substituents capable of reacting with epoxide groups, the alkyl groups of the tertiary amino groups containing 1-2 carbon atoms and the hardening agent being present in an amount of 1–20 percent on the weight of the resin.

5. A composition of matter comprising a resinous polyglycidyl ether of a polyhydric phenol and, as hardening agent, a polyalkylene polyamine in which at least the two end nitrogen atoms are those of alkyl tertiary amino groups and which is free from other substituents capable of reacting with epoxide groups, the alkyl groups of the tertiary amino groups containing 1–2 carbon atoms and said hardening agent being in mixture with a polyamide condensation product derived from an aliphatic polyamine and a dimerized unsaturated fatty acid and having amino groups in end positions.

6. A composition of matter comprising a resinous polyglycidyl ether of a polyhydric phenol and, as hardening agent, a 3–5 nitrogen atoms containing polyalkylene polyamine in which at least the two end nitrogen atoms are those of alkyl tertiary amino groups and which is free from other substituents capable of reacting with epoxide groups, the alkyl groups of the tertiary amino groups containing 1–2 carbon atoms and said hardening agent being in mixture with a polyamide condensation product derived from an aliphatic polyamine and a dimerized unsaturated fatty acid and having amino groups in end positions.

7. A composition of matter comprising a resinous polyglycidyl ether of a polyhydric phenol and, as hardening agent, pentamethyl-diethylene triamine.

8. A composition of matter comprising a resinous polyglycidyl ether of a polyhydric phenol and, as hardening agent, hexamethyl-triethylene tetramine.

9. A composition of matter comprising a resinous polyglycidyl ether of a polyhydric phenol and, as hardening agent, bis - (N:N - diethylamino - ethylaminoethyl) - amine.

10. Composition of matter as claimed in claim 7, wherein the resinous polyglycidyl ether is a resinous polyglycidyl ether of 4:4'-dihydroxydiphenyl-dimethylmethane.

11. Composition of matter as claimed in claim 8, wherein the resinous polyglycidyl ether is a resinous polyglycidyl ether of 4:4'-dihydroxydiphenyl-dimethylmethane.

12. Composition of matter as claimed in claim 9, wherein the resinous polyglycidyl ether is a resinous polyglycidyl ether of 4:4'-dihydroxydiphenyl-dimethylmethane.

13. A process of hardening a resinous polyglycidyl ether of a polyhydric phenol which comprises commingling the resin with, as hardening agent, a polyalkylene polyamine in which at least the two end nitrogen atoms are those of alkyl tertiary amine groups and which is free from other substituents capable of reacting with epoxide groups, and hardening the mixture at a temperature of at least 10 to 50° C.

14. A process of hardening a resinous polyglycidyl ether of a polyhydric phenol which comprises commingling the resin with, as hardening agent, a polyalkylene polyamine in which at least the two end nitrogen atoms are those of alkyl tertiary amine groups and which is free from other substituents capable of reacting with epoxide groups together with a polyamide condensation product derived from an aliphatic polyamine and a dimerized unsaturated fatty acid and having amino groups in end positions, and hardening the mixture at a temperature of at least 10 to 50° C.

15. A hard resinous product obtained according to the process of claim 13.

16. A hard resinous product obtained according to the process of claim 14.

17. A composition of matter comprising a resinous polyglycidyl ether of a polyhydric phenol and, as a hardening agent, an alkylene polyamine in which at least the two end nitrogen atoms are those of alkyl tertiary amino groups and which is free from other substituents capable of reacting with epoxide groups, the alkyl groups of the tertiary amino groups containing 1–2 carbon atoms.

References Cited in the file of this patent
UNITED STATES PATENTS

| | | |
|---|---|---|
| 2,712,535 | Fisch | July 5, 1955 |
| 2,681,901 | Wiles et al. | June 22, 1954 |
| 2,717,885 | Greenlee | Sept. 13, 1955 |

OTHER REFERENCES

Narracott: "Application of Some Epoxide Resins in the Plastics Industry." Pages 341–345, British Plastics 24, October 1951.

Schildknecht: "High Polymers," vol. X. Pages 439–443, Interscience Publishers Inc., N. Y., 1956.